(12) United States Patent
Derflinger et al.

(10) Patent No.: US 6,723,460 B2
(45) Date of Patent: Apr. 20, 2004

(54) FUEL CELL SYSTEM AND METHOD FOR OPERATING THE FUEL CELL SYSTEM

(75) Inventors: Monika Derflinger, Neidlingen (DE); Dietmar Mirsch, Kirchheim-Nabern (DE)

(73) Assignee: Ballard Power Systems AG, Kircheim/Teck-Nabern (DE)

( * ) Notice: Subject to any disclaimer, the term of this patent is extended or adjusted under 35 U.S.C. 154(b) by 307 days.

(21) Appl. No.: 09/898,487

(22) Filed: Jul. 5, 2001

(65) Prior Publication Data

US 2002/0031689 A1 Mar. 14, 2002

(30) Foreign Application Priority Data

Jul. 4, 2000 (DE) .......................... 100 32 419

(51) Int. Cl.[7] .............................. H01M 8/04; H01M 8/06
(52) U.S. Cl. ....................................................... 429/13
(58) Field of Search ....................................... 429/13, 20

(56) References Cited

U.S. PATENT DOCUMENTS 5,344,721 A    9/1994   Sonai et al. ................. 429/20

FOREIGN PATENT DOCUMENTS

| DE | 19921816 | 10/2000 |
| JP | 2010664  | 1/1990  |
| JP | 2183966  | 7/1990  |
| JP | 3027163  | 3/1991  |

*Primary Examiner*—Mark Ruthkosky
(74) *Attorney, Agent, or Firm*—Seed IP Law Group PLLC

(57) ABSTRACT

A fuel cell system has a fuel cell unit with at least one fuel cell and a gas generation system, which supplies the fuel cell unit with hydrogen from an operating medium, and at least one ion exchanger unit for removing ions from water. The at least one ion exchanger unit is arranged in a flow path for the operating medium, between a condensate separator and the gas generation system and is acted on by a mixture of water and the operating medium.

10 Claims, 3 Drawing Sheets

FUEL CELL SYSTEM AND METHOD FOR OPERATING THE FUEL CELL SYSTEM

BACKGROUND AND SUMMARY OF THE INVENTION

This application claims the priority of German Patent document 10032419.3, filed Jul. 4, 2000, the disclosure of which is expressly incorporated by reference herein.

The invention relates to a fuel cell system and to a method for operating a fuel cell system.

U.S. Pat. No. 5,344,721 discloses a PEM fuel cell system in which product water is extracted from the cathode exhaust gas of the fuel cell and returned to a reservoir which is carried with the system. Water recovered in this manner is cleaned in an ion exchanger before it enters the reservoir, in order to reduce its conductivity before it is introduced into the fuel cell for cooling purposes.

One object of the invention is to provide a fuel cell system, and a method for operating a fuel cell system which achieve an improved water balance. This and other objects are achieved by the fuel cell system and method according to the invention, in which at least one ion exchanger unit is arranged in a flow path in which a mixture of water and an operating medium is flowing, between a condensate separator and a gas generation system for supplying the fuel cell unit with hydrogen.

The advantage of this arrangement is that in a fuel cell system which is operated with an operating medium (such as preferably hydrocarbon or an alcohol or an ether), the ion exchanger unit can be used to clean a mixture of water and the operating medium. This makes it possible to substantially prevent damage to components and lines in the flow path for the mixture caused by corrosive high-purity water, and also makes it possible to suppress harmful deposits on catalytic components.

The use of an ion exchanger unit for a water/operating medium mixture has the further consequence that the unit advantageously acts as a highly efficient mixer element and therefore improves the homogeneity of the mixture. The use of operating media which as additives in water lower its freezing point is particularly favourable, since in this way it is possible to prevent water in the fuel cell system from freezing at low outside temperatures. A particular advantage is that, when the ion exchanger unit is exposed to a mixture of this type, freezing of the ion exchanger unit is also suppressed, since this phenomenon can make the ion exchanger unit unusable.

The invention is particularly suitable for fuel cell systems in mobile units, such as for example fuel cell vehicles, although it is also suitable for stationary systems.

Other objects, advantages and novel features of the present invention will become apparent from the following detailed description of the invention when considered in conjunction with the accompanying drawings.

DETAILED DESCRIPTION OF THE INVENTION

Figure 1:
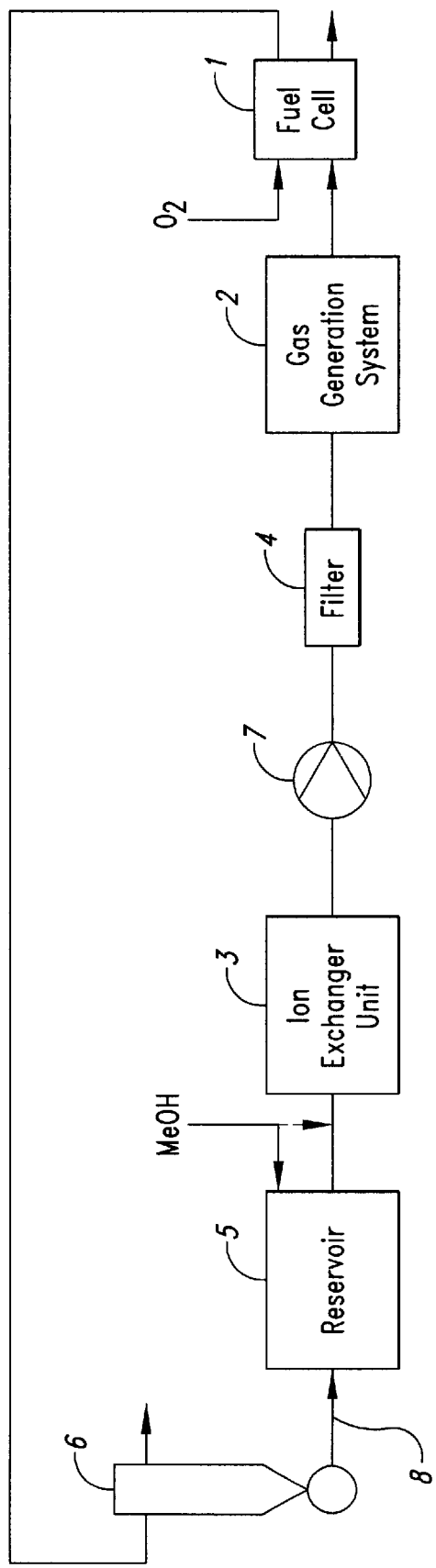
FIG. 1 shows an outline view of a preferred embodiment of a fuel cell system for carrying out the method according to the invention.

FIG. 1 shows a preferred arrangement in a fuel cell system according to the invention. A gas generation system 2 supplies a fuel cell unit 1, (which has at least one fuel cell) with hydrogen. A preferred operating medium for operating the fuel cell system is methanol (MeOH), but the invention is not restricted to this embodiment. It is also possible to use other operating media, such as hydrocarbons, ethers and alcohols.

In the gas generation system 2, hydrogen for operating the fuel cell unit 1 is generated from the operating medium and is fed to the anode of the fuel cell unit. For this purpose, the gas generation system 2 contains customary components (not shown), such as reformer unit, evaporator, carbon monoxide removal unit, etc., for obtaining hydrogen from methanol and for cleaning the fuel cell exhaust gas.

A mixture of methanol and water, held in a reservoir 5, is passed through an ion exchanger unit 3, where impurities are removed. In this arrangement, unlike in the prior art, the ion exchanger unit 3 does not perform the function of reducing the electrical conductivity of the medium flowing through it (for example an aqueous cooling medium for the fuel cell unit in the fuel cell system), since the ion exchanger unit 3 according to the invention is provided in the operating medium circuit. Rather, the gas generation system 2 itself would be sufficient to supply the fuel cell unit 1 with sufficiently highly resistant water, since the water is evaporated in the gas generation system 2 and, in the process, the steam is separated from impurities which cause electrical conductivity before passing into the fuel cell unit 1.

According to the invention, the ion exchanger unit 3 allows the fuel cell system to be operated with a high-purity water/operating medium mixture (preferably a water/methanol mixture), and therefore allows the components of the gas generation system 2 to be protected from corrosive attack from the water/methanol mixture, in particular from chlorides which may be dissolved in the mixture. A further advantage is that it is possible to prevent undesirable deposits on and contamination to the catalysts in the gas generation system 2. At the same time, the possibility of water freezing in the system at low ambient temperatures is prevented, since water is always in the mixture. Particularly when using a fuel cell system in a fuel cell vehicle, there is a risk of the fuel cell system being exposed to low ambient temperatures of this type. If an ion exchanger is provided in the system, freezing usually causes considerable problems, since ion exchangers are damaged and cease to function if water freezes.

At the same time, the ion exchanger unit 3 also serves as a coarse filter of the mixture flowing through. Downstream of the ion exchanger unit 3 there is a metering pump 7 which feeds the water/methanol mixture to the gas generation system 2 via a fine filter 4. In the gas generation system, hydrogen is obtained by means of a reforming reaction and is fed to the anode space of the fuel cell unit.

The water from the cathode and/or anode exhaust gas which is generated in the fuel cell unit and/or fed to the fuel cell system is recovered from the corresponding flows of media, preferably by means of at least one condensate separator 6. In the figure, this is shown, for example in the cathode exhaust gas flow. Water is condensed out of the cathode exhaust gas from the fuel cell unit 1, is collected in a collection vessel of the condensate separator 6 and is fed to the reservoir 5.

Expediently, the flow connection 8 between the collection vessel of the condensate separator 6 and reservoir 5 is kept as short as possible, so that it is impossible for any water to freeze in the intervening line at low ambient temperatures.

It is possible to provide means for metering methanol out of an operating medium tank to the reservoir 5 and/or into the flow path of the mixture upstream and/or downstream of the reservoir 5, so that there is always a water/methanol mixture, preferably with a defined methanol content.

Figure 2:
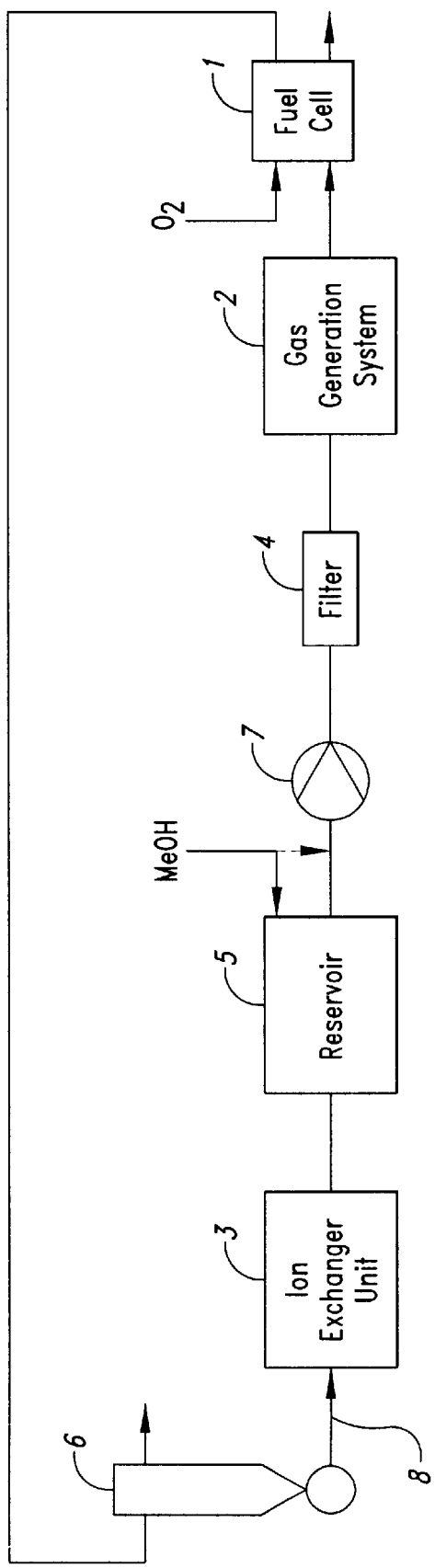
FIG. 2 shows an alternative embodiment of the fuel cell system according to the invention.
Figure 3:
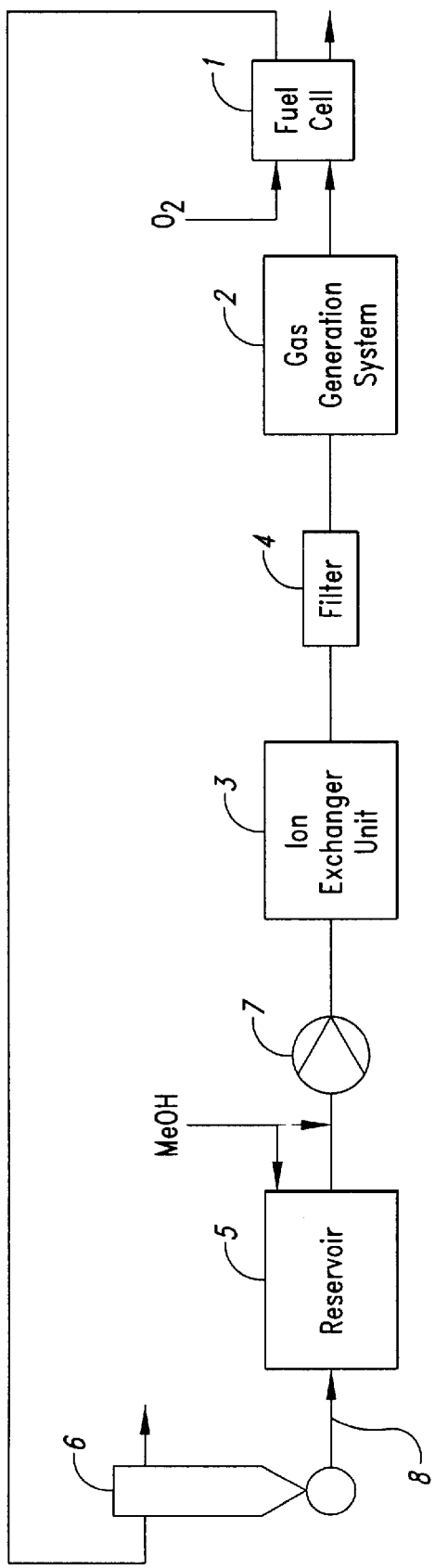
FIG. 3 shows still another embodiment of the fuel cell system according to the invention.

A further suitable installation position (not shown) for the ion exchanger unit 3 is between the condensate separator 6 and the reservoir 5, as shown in FIG. 2. This is particularly expedient since the high system pressure which prevails in the separator 6 can be used to force the media to flow through the ion exchanger unit 3 while, at the same time, there is no additional pressure loss on the suction side of the metering pump 7. In this case, the operating medium is to be metered in upstream of the ion exchanger unit 3. Still another suitable arrangement of these components is shown in FIG. 3.

It is also possible to provide a pre-delivery pump, which circulates the mixture in the reservoir 5, and to provide an ion exchanger unit 3 in the pre-delivery pump section, preferably on the delivery side of the pre-delivery pump.

According to the invention, a particularly expedient installation position for the ion exchanger unit 3 is a section of the flow path for the water/operating medium mixture which lies between the condensate separator 6 and the gas generation system 2. Areas with a pressure gradient are particularly favourable if the ion exchanger unit 3 is used on the side with the higher pressure, particularly preferably in an area at which a pressure which is higher than atmospheric pressure prevails. For example, it is also possible to provide the ion exchanger unit 3 downstream of the metering pump 7.

Usually, methanol does not mix very well with water. However, the ion exchanger unit 3 provides intimate mixing of water and methanol, so that the mixture emerges in a very homogeneous form from the ion exchanger unit 3. In this case, the ion exchanger unit 3 additionally functions as a preferred mixer element for water and operating medium.

The purification of the water/methanol mixture also ensures that the mixture has a low electrical conductivity, so that the components in the gas generation system additionally also acquire improved electrical insulation.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system comprising:
   a fuel cell unit with at least one fuel cell;
   a gas generation system, for supplying the fuel cell unit with hydrogen from an operating medium;
   a condensate separator for recovering water from an exhaust gas of said fuel cell; and
   at least one ion exchanger unit for removing ions from water; wherein
      the at least one ion exchanger unit is arranged in a flow path for the operating medium, between the condensate separator and the gas generation system; and
      the at least one ion exchanger is acted on by a mixture of water and the operating medium.

2. Fuel cell system according to claim 1, further comprising means for metering the operating medium into at least one of a reservoir for holding a mixture of water and operating medium, and the flow path for the mixture of water and operating medium.

3. Fuel cell system according to claim 1, further comprising means for metering methanol into at least one of a reservoir holding a mixture of water and operating medium, and the flow path for the mixture of water and methanol.

4. Fuel cell system according to claim 1, wherein a collection vessel of the condensate separator for separating water out of a fluid is connected sequentially to a reservoir holding a mixture of water and the operating medium, followed by the ion exchanger unit, followed by a metering pump, followed by a particle filter and followed by the gas generation system, along a flow path for the mixture of water and operating medium.

5. Fuel cell system according to claim 1, wherein:
   a collection vessel of the condensate separator for separating water out of a fluid, is connected sequentially to the ion exchanger unit, followed by a reservoir holding a mixture of water and the operating medium, followed by a metering pump, followed by a particle filter, and followed by the gas generation system, along a flow path for the mixture of water and operating medium; and
   operating medium is metered into the flow path upstream of the ion exchanger unit.

6. Fuel cell system according to claim 1, wherein a collection vessel of the condensate separator for separating water out of a fluid, is connected sequentially to a reservoir holding a mixture of water and the operating medium, followed by a metering pump, followed by the ion exchanger unit, followed by a particle filter, followed by the gas generation system, along a flow path for the mixture of water and operating medium.

7. A method for operating a fuel cell system having a fuel cell unit with at least one fuel cell; a gas generation system, for supplying the fuel cell unit with hydrogen from an operating medium; a condensate separator for recovering water from an exhaust gas of said fuel cell; and at least one ion exchanger unit for removing ions from water; wherein the at least one ion exchanger unit is arranged in a flow path for the operating medium; between the condensate separator and the gas generation system; and the at least one ion exchanger is acted on by a mixture of water and the operating medium; said method comprising:
   feeding the mixture of water and an operating medium to the at least one ion exchanger unit, to remove impurities from the mixture.

8. The method according to claim 7, wherein the mixture of water and operating medium is cleaned by the ion exchanger unit before the mixture enters the gas generation system.

9. The method according to claim 7, wherein the ion exchanger unit is used as a mixer for water and the operating medium.

10. The method according to claim 7, wherein operating medium is metered into at least one of a reservoir for holding a mixture of water and operating medium, and a flow path for the mixture of water and operating medium.

* * * * *